US006668989B2

(12) United States Patent
Reid et al.

(10) Patent No.: US 6,668,989 B2
(45) Date of Patent: Dec. 30, 2003

(54) TRAILER MOUNTED BURSTING ENERGY ABSORPTION SYSTEM

(75) Inventors: John D. Reid, Lincoln, NE (US); John R. Rohde, Lincoln, NE (US); Dean L. Sicking, Lincoln, NE (US)

(73) Assignee: Safety by Design, Co., Lincoln, NE (US)

( * ) Notice: Subject to any disclaimer, the term of this patent is extended or adjusted under 35 U.S.C. 154(b) by 0 days.

(21) Appl. No.: 10/262,367

(22) Filed: Oct. 1, 2002

(65) Prior Publication Data

US 2003/0070895 A1 Apr. 17, 2003

Related U.S. Application Data

(63) Continuation-in-part of application No. 09/935,948, filed on Aug. 23, 2001, now Pat. No. 6,457,570, which is a continuation-in-part of application No. 09/307,235, filed on May 1, 1999, now Pat. No. 6,308,809.

(51) Int. Cl.$^7$ .................................................. F16F 7/12

(52) U.S. Cl. ...................................................... 188/377

(58) Field of Search ................................ 188/371, 372, 188/374, 376, 377; 280/407.1; 256/13.1; 293/133

(56) References Cited

U.S. PATENT DOCUMENTS

| | | | |
|---|---|---|---|
| 3,143,321 A | | 8/1964 | McGehee et al. |
| 3,608,677 A | | 9/1971 | Wykes |
| 3,744,338 A | | 7/1973 | Komatsu et al. |
| 3,916,720 A | | 11/1975 | Smith |
| 4,200,310 A | | 4/1980 | Carney |
| 4,336,868 A | | 6/1982 | Wilson et al. |
| 5,181,589 A | | 1/1993 | Siegner et al. |
| 5,351,791 A | | 10/1994 | Rosenzweig |
| 5,391,016 A | | 2/1995 | Ivey et al. |
| 5,732,801 A | | 3/1998 | Gertz |
| 5,875,875 A | | 3/1999 | Knotts |
| 5,947,452 A | * | 9/1999 | Albritton .................. 256/13.1 |
| 6,308,809 B1 | * | 10/2001 | Reid et al. .................. 188/377 |
| 6,457,570 B2 | * | 10/2002 | Reid et al. .................. 188/377 |
| 2001/0013693 A1 | * | 8/2001 | Ross et al. ............... 280/407.1 |

* cited by examiner

Primary Examiner—Chris Schwartz
(74) Attorney, Agent, or Firm—Jackson Walker L.L.P.

(57) ABSTRACT

A portable crash attenuation system having a trailer frame and an energy absorption mechanism attached thereto. The absorption mechanism has a first stage pivotably connected to a second stage and the second stage is pivotally connected to the frame. By pivoting the stages about hinges the attenuation system may be folded from an extended, deployed position or mode to a shortened transit mode for easy relocation of the entire attenuation system.

4 Claims, 8 Drawing Sheets

TRAILER MOUNTED BURSTING ENERGY ABSORPTION SYSTEM

This is a continuation-in-part application based upon U.S. patent application Ser. No. 09/935,949, filed Aug. 23, 2001, now U.S. Pat. No. 6,457,570, issued Oct. 1, 2002, which was a continuation-in-part application based on Ser. No. 09/307,235, filed May 7, 1999, now U.S. Pat. No. 6,308,809, issued Oct. 30, 2001.

BACKGROUND OF THE INVENTION

The present invention relates to a traffic crash attenuation system. More particularly, the present invention relates to a system, method and apparatus for absorbing the kinetic energy from an impacting vehicle in a controlled and safe manner with roadside safety devices such as: guardrails and median barrier end treatments, crash cushions, and truck mounted attenuators. Further, the system may utilize a trailer mounted attenuator as a portable crash cushion with hinges to allow folding of the system while in transit. Two bursting tubes may be simultaneously activated. The system provides for the controlled rupturing of a tubular member by a mandrel whereby forces of an impacting vehicle are absorbed. The present inventive system may utilize a rectangular mandrel and a corresponding rectangular tubular member.

U.S. Pat. No. 4,200,310 illustrates an energy absorbing system which utilizes a number of cylindrical energy absorbing members placed in a series-type relationship on a frame mounted to a truck. The system is provided with an alignment or guidance frame. However, there is nothing which teaches any selectively controlling the rupture of the cylindrical members via a trailer mounted, hinged portable crash cushion. The mechanism of energy dissipation is significantly different than that of the present invention.

U.S. Pat. No. 3,143,321, teaches the use of a frangible tube for energy dissipation. As with the present invention, the apparatus disclosed in U.S. Pat. No. 3,143,321 uses a mandrel receivable within a tubular member. However, there is no teaching of a means for selectively controlling the rupturing along a length of the tubular member.

Further, U.S. Pat. No. 3,916,720 discloses an energy absorbing steering column relying upon frictional forces to dissipate impact energy. U.S. Pat. No. 5,732,801 teaches the use of an energy absorbing bumper support structure having collapsing cylinders. Again, neither reference teaches the rupture of tubular absorbers within a portable, hinged structure.

BRIEF DESCRIPTION OF THE DRAWINGS

FIG. 6B illustrates the trailer system of FIG. 6A in the transit mode in a side elevation view.

DETAILED DESCRIPTION OF THE PREFERRED EMBODIMENT

Figure 1A:
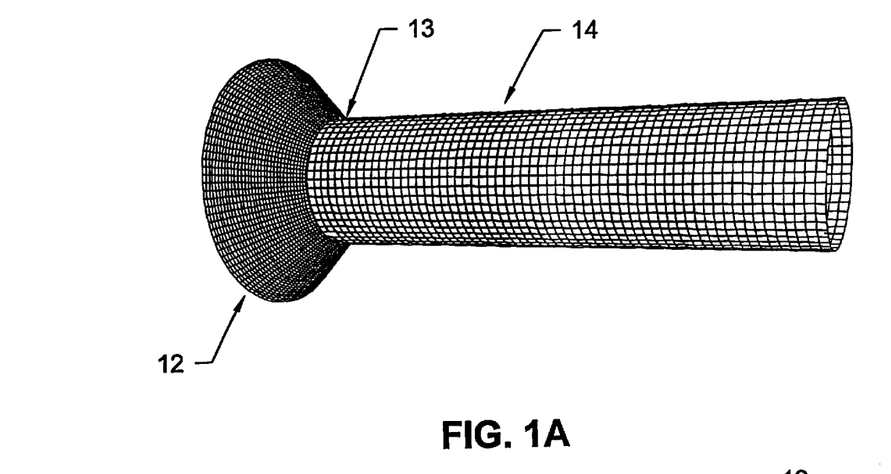
FIG. 1A is an isometric view of a mandrel and tubular member for use in the present invention before impact forces are applied.
Figure 1B:
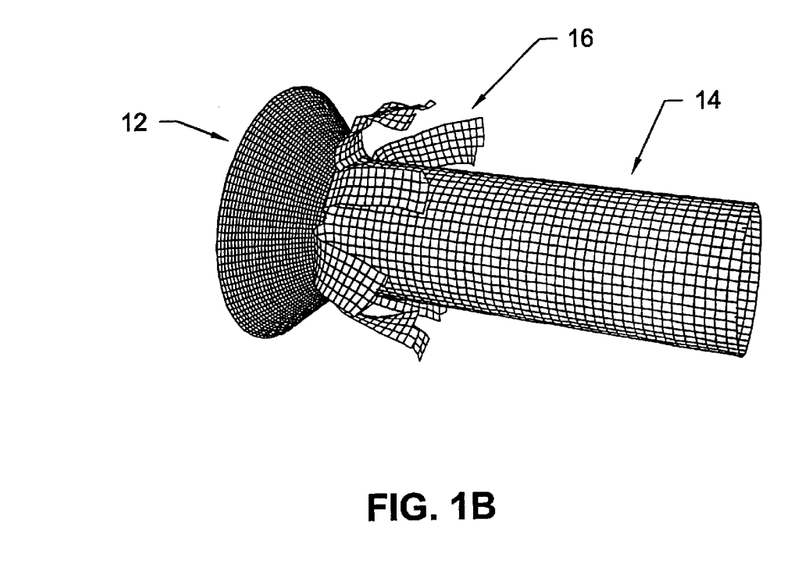
FIG. 1B illustrates the rupturing of the tubular member by the mandrel upon impact.

A controlled fracture or rupturing mechanism which may be used with the attenuator of the present system is based on the concept that, when an over-sized plunger with a tapered surface (mandrel 12) is forced into a thin-wall tubing 14 of the generally same shape, pressure is exerted on the edge of the tubing from the inside, as illustrated in FIGS. 1A and 1B. The pressure initially expands the size of the thin-wall tubing, first elastically until the yielding strength of the metal is reached and then plastically. The tubing eventually fractures or ruptures 16 at the edge when the ultimate tensile capacity of the material is exceeded. This process of expanding and fracturing the thin-wall tubing 14 is repeated and energy dissipated as the mandrel 12 proceeds forward. This process can be applied to tubes manufactured from a variety of materials, including, but not limited to, steel, aluminum, fiber reinforced plastic (FRP), polymers such as high density polyethylene, and concrete or other ceramics.

Although this concept may be used with both brittle materials and ductile materials, brittle materials, such as frangible aluminum, ceramics, or concrete, fragment during the process and produce shrapnel that could pose a hazard to nearby traffic or pedestrians. The use of ductile materials or brittle materials which are appropriately coated so as not to produce shrapnel-like fragments may be used. Ductile materials, such as steel, polymers, or FRP materials with longitudinal reinforcement, tear into a number of longitudinal strips that remain attached to the undeformed portions of the tubular energy absorber.

The amount and rate of energy dissipation can be controlled by varying the shape, size, thickness, and strength of the thin-wall tubing 14 and the number of tubes. The location and required force level of the rupture can be controlled by incorporating stress concentrators on the tubing, using holes 17, slots 18, notches, cuts, scores and strengtheners such as gussets 19, shown in FIGS. 3A and 4A, or on the mandrel 12, using raised edges 30 as shown in FIG. 2C, or varying the geometrical shape of the mandrel. Further stress concentrators may include the use of preferential material orientation such as fiber alignment in fiber reinforced plastics or cold rolling of metals to produce elongated grain boundaries.

Figure 2A:
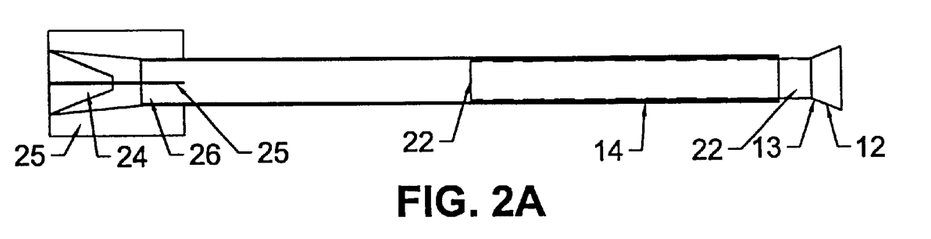
FIG. 2A is a side elevation view of an embodiment of an energy absorption component for use in the present invention having a mandrel with a forward tubular extension and a tubular member with a second mandrel.
Figure 2B:
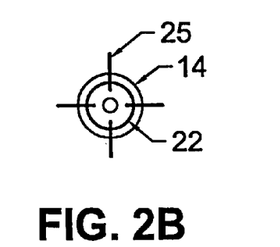
FIG. 2B is an end view of the illustration of FIG. 2A.
Figure 2C:
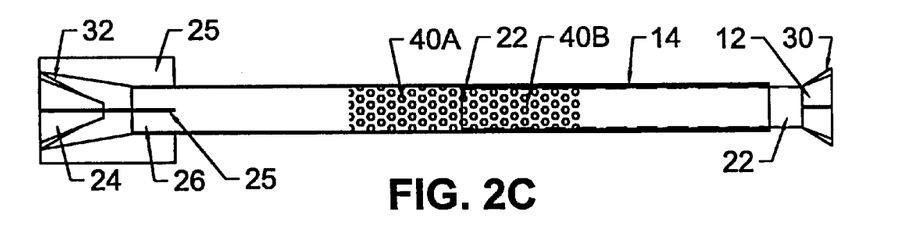
FIG. 2C is a side elevation view of an embodiment of an energy absorption component for use in the present invention with the first and second mandrels having stress concentrators.
Figure 2D:
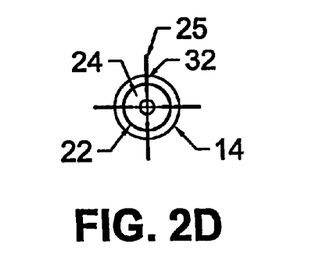
FIG. 2D is an end view of the illustration of FIG. 2C.

FIG. 2A shows a two-stage splitting system that involves splitting first one tube 14 and then another 22. The first tube 14 is attached to a roadside safety device (not shown). Initially upon impact of a vehicle with an impact head (not shown in FIG. 2A), the hollow tube extension 22 on mandrel 12 on the right is pushed into the outer tube 14. The mandrel 12 engages outer tube 14, causing it to split or rupture as illustrated in FIG. 1. After further displacement, the hollow tube extension 22 contacts a second, conical shaped mandrel 24 on the far end 26 of the outer tube 14 and is itself split. Each rupturing allows for controlled absorption of impact energy. Mandrel 24 is supported to outer tube 14 by gussets 25.

FIG. 2C illustrates a two stage system with gusset plates or raised edges 30 and 32 extending outward from the mandrels 12 and 24, respectively. These gusset plates 30 and 32 illustrate an example of a stress concentrator placed on the outer tube. The tubes may be provided with slots or strengthening members to control the rupturing process.

In addition, the controlled fracturing mechanism can be used in combination with other means of energy dissipation. Energy absorbing materials 40A and 40B (FIG. 2C) (e.g., aluminum honeycomb or composite tube, etc.) can also be placed inside of the tubes to increase the energy dissipation capacity as shown in FIG. 2C.

For end-on impacts, the vehicle will contact the impact plate 132 (FIGS. 6A, 6B, and 7), i.e., end of the impact head 104, and push it forward. This in turn will push the mandrel 12 (FIGS. 1A, 1B, 2A, 2C, 3B, and 4A) or 12A (FIGS. 5A and 5B) or 138 (FIG. 7) forward into the thin-wall tubing and start the process of expanding and fracturing/bursting of the tubing. This process will continue until: (a) the impacting vehicle is brought to a safe and controlled stop; (b) the entire length of the tubing is fractured; or (c) the impacting vehicle yaws out and disengages from the impact head.

For impacts that are end-on at a large angle, the impacting vehicle will initiate the controlled fracturing/bursting process until the thin-wall tubing is bent out of the way or the mandrel disengages from the thin-wall tubing, and then gate behind the device. Similarly, the impacts on the side of the thin-wall tubing 14 near the end of the device cause the thin-wall tubing will be bent out of the way, allowing the vehicle to gate behind the device. Thus, when struck on the corner, either on the end or the side of the cushion, the energy absorbing mechanism begins to collapse longitudinally providing lateral resistance as it begins to bend out of the way.

For impacts into the side of the thin-wall tubing downstream of the beginning of length-of-need, the thin-wall tubing will act like a barrier and contain and redirect the impacting vehicle. An anchoring mechanism will be necessary to resist the tensile forces acting on the tubing to contain and redirect the vehicle. Note that this requirement of containment and redirection is applicable only for devices that have redirective capability, such as a terminal or a redirective crash cushion.

Figure 3A:
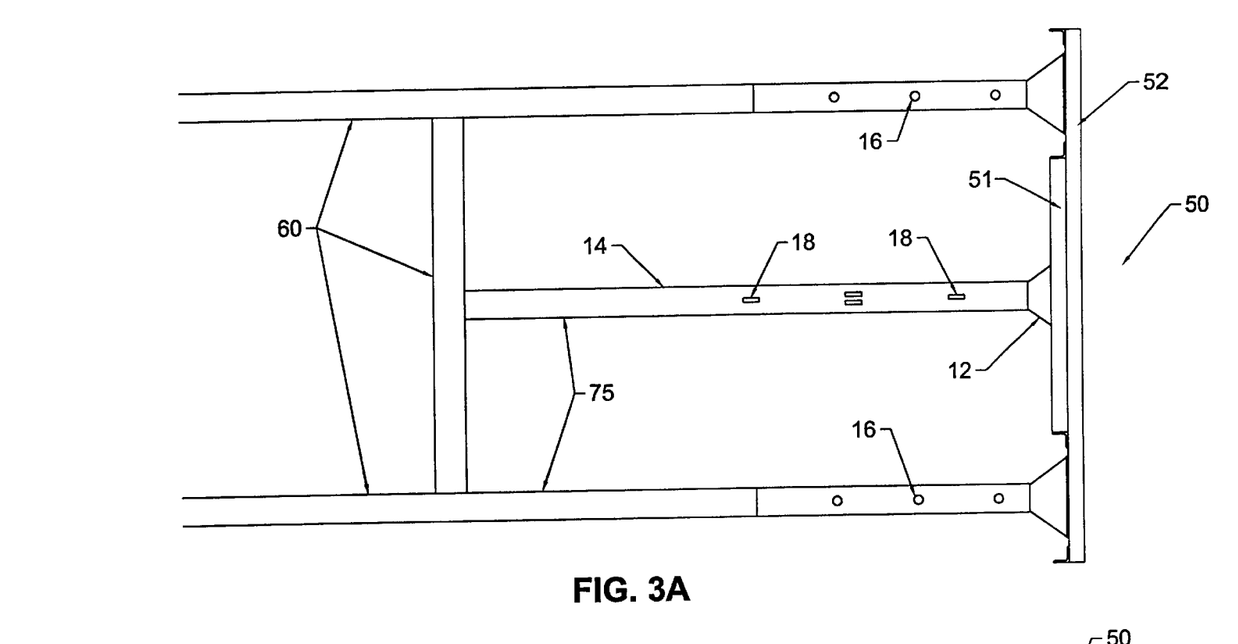
FIG. 3A shows a top plan view of the present invention with the controlled fracture energy absorbers attached to an impact head and trailer or truck mounted frame elements.
Figure 4A:
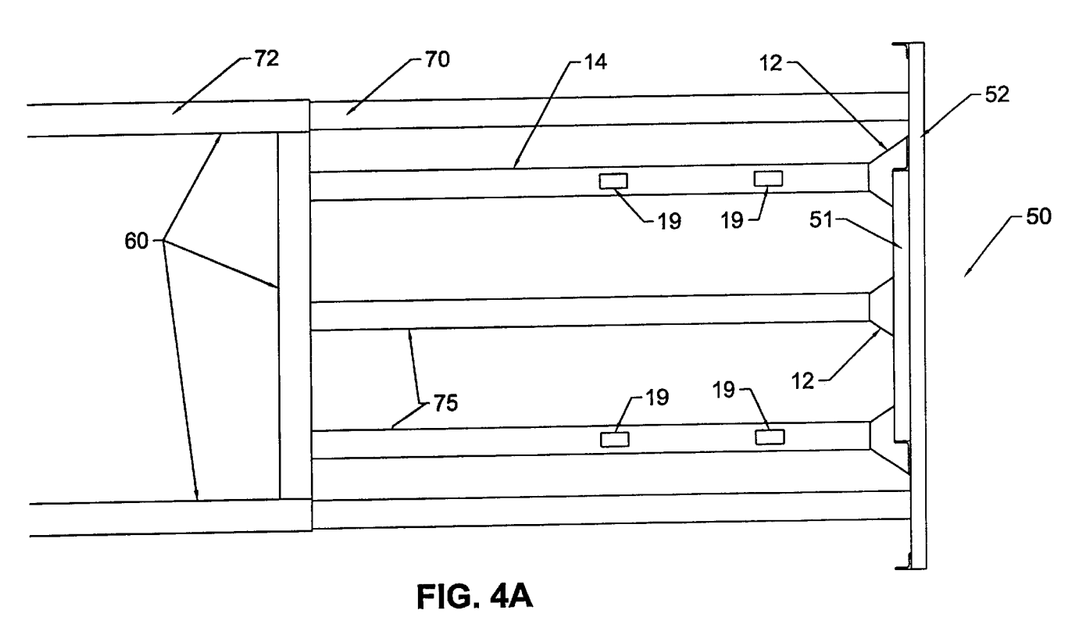
FIG. 4A shows a top plan view of an alignment member attached to the trailer or truck mounted frame.

One particular roadside safety device utilizing the controlled fracture mechanism consists of a few major components, as illustrated in FIGS. 3A and 4A. Thin-wall tubing 14 is utilized. The tubing may have a circular, square, or rectangular cross-section. The edge of the front end of the tubing (i.e., the end into which the mandrel is attached) may have notches or slots to control the location(s) of the fracture for the tubing. The tubing may also have longitudinal slots cut along portions of its length to control the rate of energy dissipation.

Figure 3B:
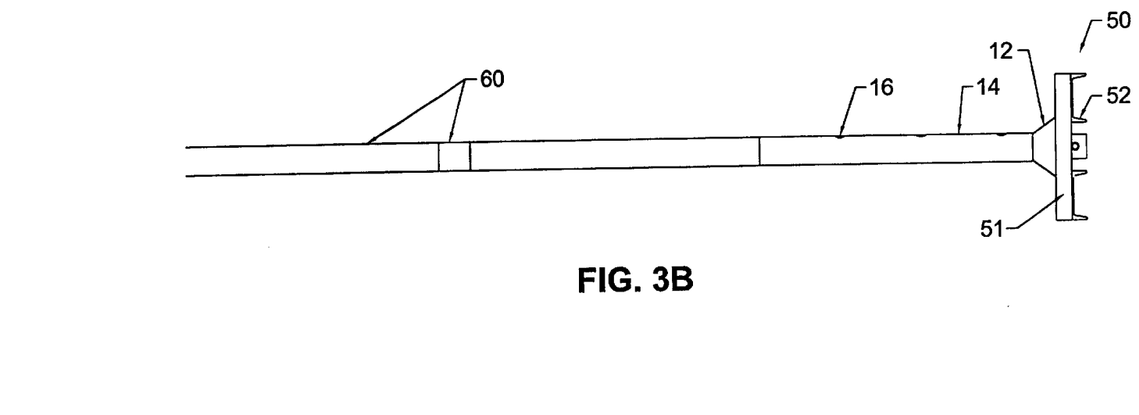
FIG. 3B is a side elevation view of the illustration of FIG. 3A.
Figure 4B:
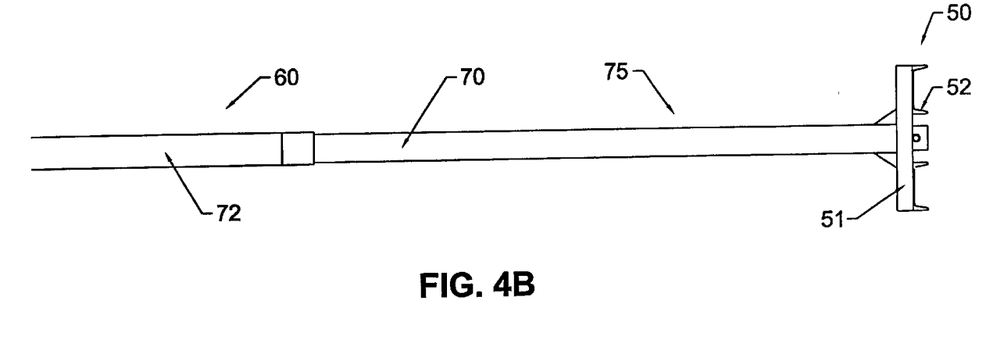
FIG. 4B is a side elevation view of the illustration of FIG. 3C.

An impact head/plate 50 is provided. Details of the impact head/plate are shown in FIGS. 3B and 4B. The impact head 50 consists of an impact plate 51; a means to provide mechanical interlock 52 between the impact head and the front of the impacting vehicle, such as raised edges around the impact plate 50; and a mandrel 12 welded to the back of the impact plate 50.

The mandrel 12 is much stronger (having a greater tensile strength, a greater thickness, or greater hardness) than the splitting tube 14 to prevent the mandrel from deforming. The mandrel 12 need not have the same cross-sectional shape as the thin-wall tubing, however, there must be only small clearances between the mandrel and the tubing in order to prevent misalignment. For example, channel or wide flange shapes could be used with rectangular frame rail elements as long as the height and depth of the open sections were close to the same as the clear opening in the tube.

The head 13 of the mandrel 12 is tapered so that only the leading portion of the mandrel head 13 initially will fit into the thin-wall tubing. The mandrel 12 may have stress concentrators, e.g., a particular geometrical shape or raised edges, to control where the thin-wall tubing will fracture. For square or rectangular tubes, the mandrel may have a corresponding square or rectangular shape that flares outward. This type of tube/mandrel combination, as discussed below in relation to FIGS. 5A and 5B, assures that the tube splits at the corners where strain hardening during manufacturing has made the metal less ductile.

As mentioned previously, the controlled fracture mechanism may be used in combination with other forms of energy dissipation. One such design (FIG. 2C) may include the placement of some form of energy absorbing material 40A and 40B, such as aluminum honeycomb or composite tube inside the thin-wall tubing. As the mandrel proceeds forward, the mandrel will fracture the thin-wall tubing as well as crush or compress the energy absorbing material inside the tubing for additional energy absorption.

For example, a composite tube trailer or truck mounted attenuator may use a crushable composite beam as its primary energy dissipation mechanism. Two typical embodiments of this device are shown in FIGS. 3A and 4A. One embodiment, shown in FIG. 4A, uses telescoping frame rail elements 70 and 72 to maintain lateral stability and alignment for the attenuator and utilizes the controlled fracture concept with composite tubes to provide the energy dissipation. Frame 60 is mounted to the trailer or truck to support the head 50 and energy absorption mechanism 75. It is envisioned that cables or thin steel straps (not shown) may be used to brace the frame 60. Cables may be attached to the back of the frame on one side and to the front of the frame on the other side to prevent lateral "racking" of the frame system.

Another embodiment utilizes controlled fracture frame rail elements in addition to composite tube energy absorbers as shown in FIG. 3A. A given system may have additional energy absorbers placed inside of the telescoping tubes or outside.

As previously stated, the tube bursting energy absorber works on the principal that the energy associated with the propagation of cracks along the length of a tube can be carefully controlled and utilized to dissipate the energy of an impacting vehicle. This system incorporates a tapered mandrel that is forced inside an energy absorbing tube of slightly smaller dimensions. As the tapered mandrel is forced inside the tube, hoop stresses develop in the energy absorbing tube and these stresses are then used to propagate cracks along the length of the tube. The cracks propagate in front of the mandrel such that there is no direct contact between the mandrel and the crack surfaces, thereby limiting friction. The system's operation is somewhat different when incorporated for round and square energy absorbing tubes.

Although a number of energy absorbing systems utilized collapsing round tubes, none of the prior inventions have incorporated square tubes. The corners of square tubes make these energy absorbers perform much differently than round tubes. Because square tubes have rounded corners, a tapered square mandrel forced inside a square tube will tend to contact the tube only in the vicinity of the corners. Although such a system would eventually produce ruptures in the corners of the tube, the sharp corners of the mandrel would contact the crack surfaces and high friction forces would be generated.

Figure 5A:
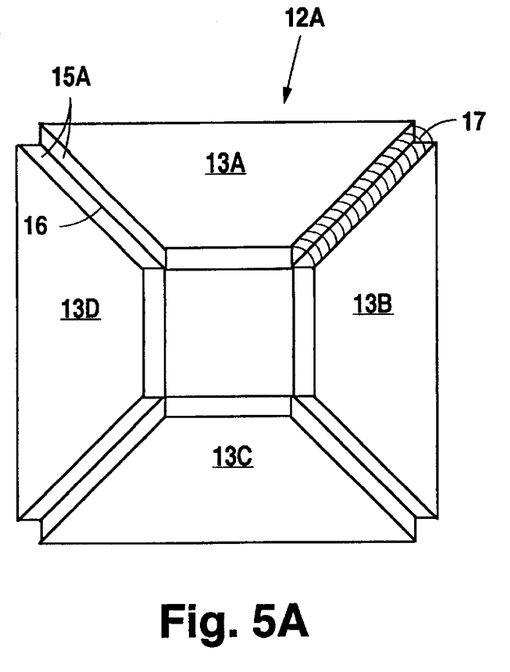
FIG. 5A illustrates a rectangular mandrel of an energy absorption component for use in the present invention.
Figure 5B:
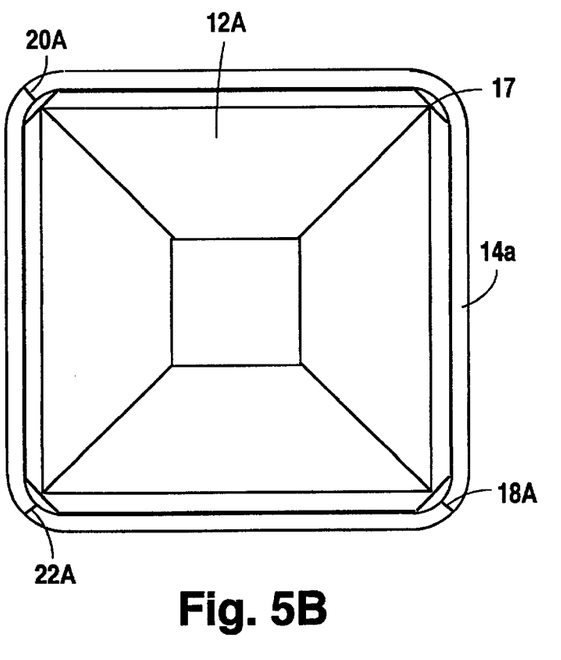
FIG. 5B shows a rectangular tubular member of an energy absorption component for use in the present invention.

A tube bursting energy absorber may avoid this situation by using a tapered mandrel with bevels at each corner. As shown in FIG. 5A, the preferred mandrel 12A for square tubes 14A (FIG. 5B) involves welding four steel plates (13a, 13b, 13c, and 13d) together to form a pyramid. The interior edges of the plates are placed together and the valley 16 is fillet welded to form a relatively flat, beveled surface 17 at each corner (only one corner is shown in FIG. 5A with the flat, beveled surface 17). As shown in FIG. 5B, this configuration allows the mandrel 12A to contact the square tube 14A everywhere but the rounded corners 18A. As the tube is pushed onto the mandrel, the rounded corners will be placed in tension and straightened out. As this happens, stress concentrations where the tube walls bend around the beveled edges of the mandrel will initiate cracks. These cracks will then propagate in front of the mandrel 12A to produce a controlled energy absorbing system. The mandrel will not contact the crack surfaces and therefore friction between the mandrel and the energy absorbing tube is minimized.

Because there are two crack initiators at each corner, two cracks can start and propagate simultaneously. Normally only one of these two cracks will dominate and the other crack will stop propagating. However, when this occurs, one side of the tube is actually a very shallow channel shape, which tends to dissipate more energy when the cracked walls are curled back. Saw cut manufactured cracks placed in the center of each corner can force the crack to run down the center of the tube corner. Thus, initial manufactured cracks can lower the energy dissipation associated with square tubes to some extent.

The energy dissipation rate for this system may be controlled by a number of factors, including the thickness of the energy absorbing tube, bevel angle on the mandrel, lubrication applied to the inside of the energy absorbing tube, and the material used in the energy absorber. Energy is dissipated by the tube bursting energy absorber through three primary mechanisms: crack propagation, curling of the cracked sections of tube, and friction. Crack propagation energy in a square or rectangular tube is controlled primarily by the type and thickness of the material used in the energy absorbing tube. More ductile and tougher metals have higher strain energy release rates and thus dissipate more energy. Likewise, thicker tubes also absorb more energy in the crack propagation process.

Energy dissipated as the cracked sections of a rectangular tube are curled back is controlled by the taper angle of the mandrel and the thickness of the material. Higher mandrel taper angles decrease the radius of the curled sections of cracked tube and thereby increase the energy dissipated in the bending process. However, lower taper angles do increase friction slightly, thereby offsetting the decreased bending energy to some extent. Tube thickness also affects the energy required to curl the cracked sections of the tube.

Friction is the other major source of energy dissipation. Lubricants placed inside the energy absorbing tube can greatly reduce friction energy. Although conventional lubricants such as grease or oil, and other hydrocarbon compositions, can serve this purpose, other lubricants could include zinc used in the galvanizing process, paints, ceramic composition surfaces, and even rust particles.

Round tubes made from ductile materials, such as low carbon steel, will deform greatly when a tapered mandrel is driven inside. If the energy absorber does not include weakening mechanisms as described by Smith (1975), the tube will expand sufficiently to completely engulf the mandrel. In this case, the forces required to push the mandrel inside the energy absorber rise rapidly and the system is ineffective. Smith teaches that, by using a pattern of slots in the energy absorbing tube, it can be made to deform outwardly away from the mandrel and fold back upon itself. In this situation the energy absorbing forces are controlled, but the cost of producing the large numbers of slots, holes, or other weakening mechanisms is high. As described above, a tube bursting energy absorber may involve propagating cracks along the length of the tube. For round tubes, these cracks must be manufactured in the end or along the side of the tube. The cracks are manufactured by placing small saw cuts at strategic points around the tube or by scoring the surface of the tube along its length. FIG. 5A shows a saw cut 20A in the center of one of the rounded corners. Optimally, saw cuts should be twice as long as the wall thickness of the energy absorbing tube. FIG. 5A shows a score 22A in the center of one of the rounded corners. Scores need only be 10–20% of the thickness of the energy absorbing tube in order to propagate the crack. Scoring refers to a shallow notch, cut, mark, or scratch down the side of the tubes. Typically, they look like little grooves down the sides of the four corners in the rectangular tube configuration. However, the scores could be placed any place along the tube to enhance or promote crack propagation and/or reduce the bursting force levels. Scores may be placed on the outside or inside of the tubes. When forced inside the energy absorbing tube, the mandrel creates high hoop stresses which will cause the cracks to grow in a opening mode.

There are two primary advantages of this system. The first advantage is that small saw cuts and/or shallow surface scores are very inexpensive to produce. The second advantage of this approach is that the cracks propagate in front of the mandrel in a manner to prevent direct contact between the mandrel and the crack tip. By keeping the mandrel out of the crack tip, friction is greatly reduced and the energy dissipation rate is controlled.

Just as in the case with the square tube, the energy dissipation rate of the absorber can be influenced by the thickness of the energy absorbing tube, bevel angle on the mandrel, lubrication applied to the inside of the energy absorbing tube, and the material used in the energy absorber. The primary difference in energy dissipation between round and square tubes is that round tubes can have a number of different crack configurations. The crack propagation energy is directly related to the number of cracks induced in the tube. The energy dissipated as the cracked sections of tube are curled back is controlled by the taper angle of the mandrel and the number of cracks induced in the tube. When more cracks are induced in the tubes, the moment of inertia of each cracked section is reduced. By reducing the section modulus, the energy required to bend each section back is reduced. Energy dissipation by round tubes is also controlled by all of the factors mentioned previously for the square tube.

For any given tube configuration, energy dissipation rates are relatively constant. However, for many safety applications it is desirable to design energy absorbers with multiple energy absorption stages. Another advantage of the tube bursting energy absorber is that multiple stages are easily implemented by nesting energy absorbing tubes of varying lengths. For example, a two-stage energy absorbing system can be set up by inserting a longer tube inside a shorter tube of larger dimension. The first stage would consist of a single tube while the second stage would consist of two nested tubes. When the mandrel reaches the nested tube, cracks will be propagated down both the inner and outer tubes and the energy dissipation increases to a higher level. The energy dissipation rate for the two combined tubes is generally less than the sum of the rate for each tube bursted separately. This decrease can be attributed to reduced friction associated with the combined bursting process.

Another means of developing a two-stage energy absorbing system is to score only the front portion of a tubular section. The scored section of the tube typically has a lower energy dissipation rate than the un-scored portion of the tube, thus forming a two-staged energy absorbing system.

A box-beam burster trailer mounted attenuator 100 (shown in FIGS. 6A–6C, 7A–7C, 8 and 9) is application of the box-beam Burster Energy Absorbing Tube (BEAT) concept. The unique features of such an application include:

(a) A trailer mounted attenuator as a portable crash cushion. Other BEAT applications, such as guardrail terminal and single sided crash cushion, are fixed installations.

(b) The trailer mounted attenuator may use tubular energy absorbers. Other existing cushions used with truck mounted attenuators (TMAs) use a crushable material to absorb the kinetic energy from the impacting vehicle.

(c) Hinges are incorporated into the tubular energy absorbers of the trailer mounted attenuator. This allows for folding of the attenuator while in transit. Yet, the bursting process discussed above continues smoothly through the hinges on the crash cushion.

(d) There may be the bursting of two tubes simultaneously.

(e) A beam breaker may be used to disengage the cross beam member, which is used to keep two tubes separated at a fixed distance to ensure proper functioning of the two mandrels.

(f) A lubricant, such as a zinc based paint, may be used on the inside of the tube to lower and control the level of energy dissipation.

(g) A nested tube may be used to increase and control the level of energy dissipation.

(h) Adjustable legs at the back of the cushion may be used to provide stability to the trailer and to maintain the cushion at the proper height for the bursting process.

Figures 6A, 6D:
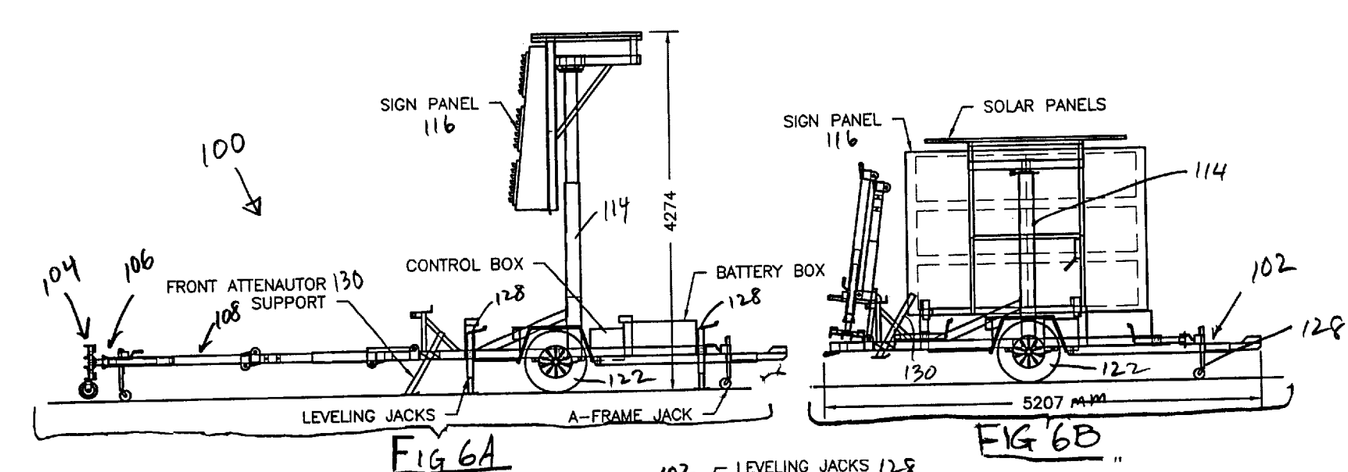
FIG. 6A is a side elevation view of a trailer system of the present invention in the deployed mode.
Figure 6C:
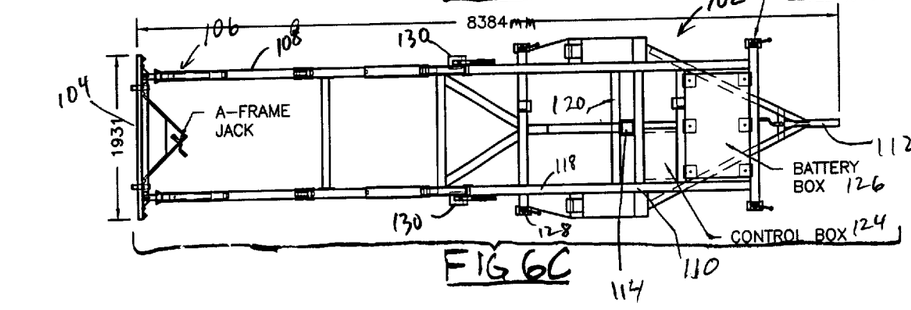
FIG. 6C shows a top plan view of the deployed system of FIG. 6A. For clarity purposes, a sign panel or solar panels are not shown.

As shown in FIGS. 6A–6C, trailer mounted attenuator 100 comprises a trailer frame 102, an impact head assembly 104, a mandrel assembly 106, and energy absorbing tubes 108.

The trailer mounted attenuator 100 is designed to be folded up during transit and then folded down for deployment.

The attenuator 100 is attached to the trailer frame, as shown in the drawings. The overall length of the system, i.e., trailer frame plus attenuator, is 8384 mm (27 ft., 6 in.) in the deployed position (FIG. 6C). The attenuator is designed to be folded up for transit and the length of the system with the attenuator in the folded up position is 5207 mm (17 ft., 1 in.) (FIG. 6B). The maximum width of the trailer assembly is 2092 mm (6 ft., 10 in.) at the wheel fenders. The height from the ground to the top of the sign panel in a fully deployed position is 4247 mm (14 ft.) The total weight of the system is approximately 2,177 kg (4,800 lb.) The length, height and weight of the system may vary depending on the particular sign panel and trailer. More discussions on the effects of variations of the physical dimensions and weight of the system on the trailer mounted attenuator are presented below.

FIG. 6C shows the layout of the trailer frame 102. The key features of the trailer frame include:

(a) a main frame 104;

(b) a tongue 112 for attaching the trailer to the towing vehicle;

(c) a mast 114 for attachment and support of the sign panel 116;

(d) attachment 118 for mounting of the trailer axle 120 and tires 122;

(e) spaces for control box 124, battery box 126 and other accessories;

(f) four A-frame jacks 128 for keeping the trailer stable in a stationary position; and (g) two front supports 130 for the trailer mounted attenuator.

The trailer frame is 4801 mm (15 ft., 9 in.) long and 1829 mm (6 ft.) wide. The main frame may be fabricated from structural tubes. The tongue may be fabricated from structural tubes and attached to the main frame with angles. A vertical mast 114 fabricated from structural tube may be attached to the main frame for mounting of the sign panel and support. The trailer axle 120 is attached to the underside of the main frame and the tires are shielded with fenders. There are spaces on top of the main frame for installation of the control and battery boxes and other accessories needed for the sign panel display. Four A-frame jacks are provided to keep the trailer stable when it is in a stationary position. There are also two adjustable supports fabricated from structural tubes with sliding plates on the bottom. These two supports are attached to the side rails of the main frame near the back with brackets to provide support for the front of the trailer mounted attenuator. The attenuator is attached to the trailer frame with specially designed hinges (FIGS. 8 and 9) to facilitate fold-up of the attenuator during transit.

Figure 7A:
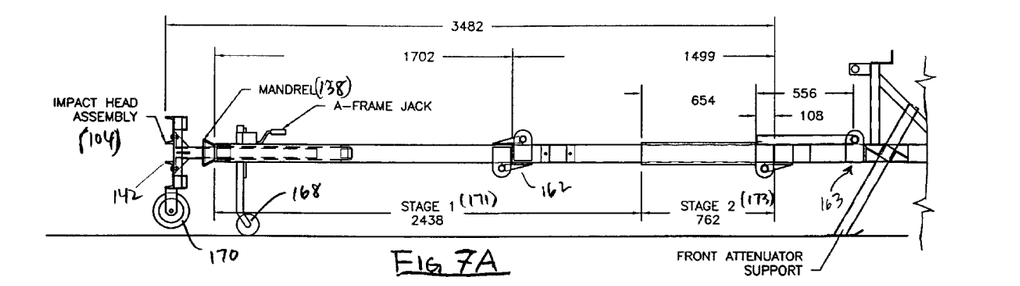
FIG. 7A is a detailed side elevation view of a trailer mounted attenuator of the present invention in the deployed mode.

Turning to FIG. 7A it may be seen that the impact head assembly 104 has a front impact plate 132, two mandrel tubes 134 that insert into the energy absorbing tubes 136, two tapered mandrels 138, and a beam breaker assembly 140. The front impact plate has overall dimensions of 1931×406 mm (6 ft., 4 in.×16 in.). The impact plate may be fabricated from two channels as horizontal members connected with angles as vertical supports on the backside at the two ends. The channels also may be stiffened on the backside with structural tubes. The impact plate distributes the impact load while wide protruded edges 142 of the channels provide a mechanical interlock with the impacting vehicle.

Figures 9, 10:
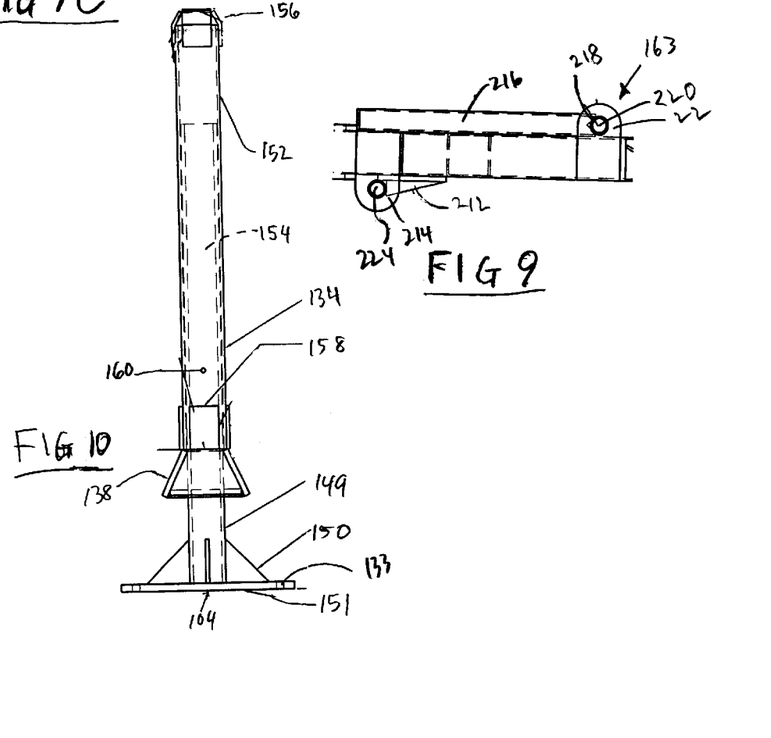
FIG. 9 is a side elevation view of a downstream hinge used with the attenuator of FIG. 7A.
FIG. 10 is a cross section view of the mandrel tube of the present invention.

Two mandrel tubes 134 are attached to the back of the channels. FIG. 10 illustrates one such tube in cross section. The upstream end 149 of the mandrel tube is welded to the back of a base plate 151 with gussets 150. The base plate 151 also has four holes 133 for bolting to the back of the impact plate 104. A tapered mandrel 138 fabricated from thick plates, as described above, is welded to the tube upstream of the base plate. The cross sectional dimension of the mandrel increases while the inside dimensions of the energy absorbing tube 136 remains constant. The downstream end 154 of the mandrel tube is inserted into the upstream end of a guide tube 152 for a distance of approximately 610 mm (24 in.). The guide tube is fabricated from structural tube. The downstream end of the guide tube has a tapered end 156 fabricated by welding thick bent plates to the tube, which acts like a plunger to shear off bolts at connections and hinges. Guide plates 158 are welded around the upstream end of the guide tube to control the clearance of the guide tube within the energy absorbing tube 136. A bolt 160 is used to hold the guide tube in place within the stage one energy absorbing tube.

Figure 7B:
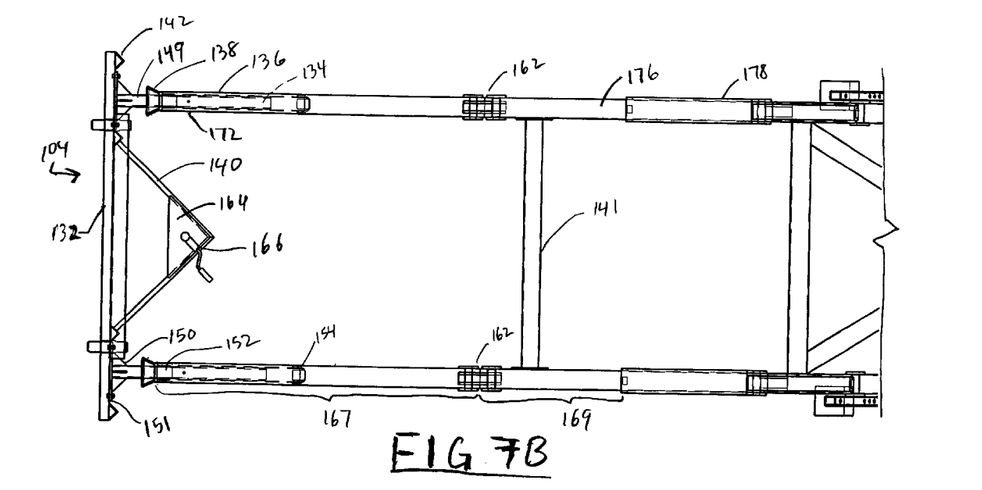
FIG. 7B is a detailed, partial top plan view of the deployed trailer mounted attenuator of FIG. 7A.

A beam breaker 140 is welded to the back of the impact head assembly to knock off the cross beam member 141 just downstream of the first hinge 162, as shown in FIG. 7B. The beam breaker is fabricated from structural tubes in the form of a triangle. A support plate 164 is welded to the downstream tip of the beam breaker assembly for attachment of an adjustable A-frame jack 166 with a wheel 168 to keep the attenuator at the proper elevation for impact. In addition, there are wheels 170 attached to the bottom of the front impact plate. These wheels are typically off the ground when the A-frame jack is deployed. However, upon impact, the A-frame jack may (potentially) be bent and these wheels will come into play, keeping the attenuator at the proper elevation for the bursting process.

The trailer mounted attenuator is designed with two stages of energy absorbers, as shown in FIG. 7A. The stage one energy absorber is fabricated from structural tubes. The first stage energy absorber 171 has two levels of energy absorption. The first section 172 of the stage one energy absorbing tube is coated with a zinc rich paint for lubricant. The lubricant reduces the bursting force per tube. Without the lubricant, the bursting force for the first stage energy absorber is greater per tube. The second stage energy absorber 173 incorporates two nested tubes: an inner tube 176 and an outer tube 178. The nesting of the tubes raises the bursting force per nested tube.

Figure 7C:
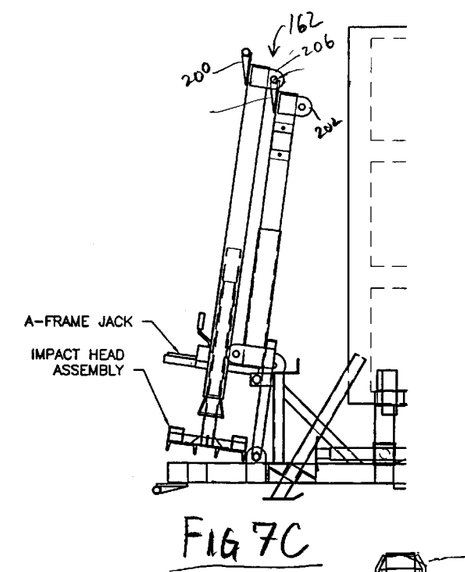
FIG. 7C illustrates a detailed, partial side elevation view of the trailer system of FIG. 6B in the transit mode.
Figure 8:
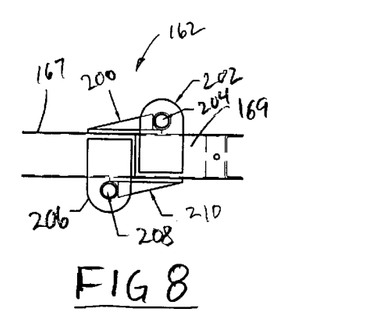
FIG. 8 is a side elevation view of an upstream hinge used with the attenuator of FIG. 7A.

FIG. 7C shows that to facilitate fold-up of the attenuator during transit, the stage one energy absorber 171 is divided into two sections (167 and 169), joined by a hinge 162, as shown in detail in FIG. 8. In one embodiment the length of the first section of structural tube is 1702 mm (67 in.). This length incorporates both the lubricated and unlubricated sections of the stage one energy absorber. The length of the second section is 1499 mm (59 in.), 762 mm (30 in.) of which is nested with the outer tube. Thus, the effective length of one embodiment of the stage one energy absorber is 2439 mm (8 ft.), consisting of 1067 mm (42 in.) of lubricated section and 1372 mm (54 in.) of unlubricated section. The length of the stage two energy absorber is 762 mm (30 in.)

FIG. 8 shows first hinge member 162. Rigidly attached to the upper side of the first section 167, stage one energy absorber tube 136 is first tongue section 200 while rigidly attached to the second section 169 is a first yoke portion 202 of hinge 162. A removable pin 204 is used to releasably join the tongue 200 and yoke 202 sections. On the underside of the first section 167 a second yoke 206 is rigidly attached with a second pivot pin 208 connecting a second tongue section 210 which has been rigidly attached to the underside of section 169. When the portable attenuator system is to be moved from the deployed position (FIG. 7A) to the transit position (FIG. 7C) the first pin 204 is removed, allowing the first section 167 to fold over the second section 169.

FIG. 9 illustrates a second hinge 163 used to fold the system into a transit/deployed mode. A third yoke and tongue arrangement is provided. Third tongue section 212 is rigidly affixed to the underside of the frame 102 while third yoke section 214 is a part of arm 216 which extends back to hinge 163. A pivot sleeve 218 is provided in arm 216 to allow a pivot pin 220 to pass through fourth yoke 222 attached to the frame 102. A second removable pivot pin 224 releasably connects the third yoke and tongue arrangement. The second removable pin 224 is removed when the attenuator apparatus 100 is moved from the deployed position (FIG. 7A) to the transit position (FIG. 7C).

The upstream end of the stage one energy absorbing tube is notched at the corners and the first section of the tube is scored at each corner to facilitate initiation of the bursting process as was discussed above. The portions of the energy absorbing tubes under hinge plates are also scored in the same manner to allow the bursting process to easily pass through the spliced region. The upstream end of the outer tube for the stage two energy absorber is also notched at the corners to facilitate initiation of the bursting process.

There is a cross beam member 141 just downstream of the first hinge 162. The purpose of this cross beam member is to maintain proper separation between the two energy absorbing tubes so that the impact head and the associated mandrels can proceed with the bursting process down the tubes without binding. This cross beam member is structural tube and bolted at both ends to the two energy absorbing tubes.

Although the invention has been described with reference to a specific embodiment, this description is not meant to be construed in a limiting sense. On the contrary, various modifications of the disclosed embodiments will become apparent to those skilled in the art upon reference to the description of the invention. It is therefore contemplated that the appended claims will cover such modifications, alternatives, and equivalents that fall within the true spirit and scope of the invention.

What is claimed is:

1. A portable crash attenuation system comprising:
a trailer frame;
an energy absorbing mechanism having a first stage energy absorbing section pivotably connected at a first hinge member to a second stage energy absorbing section pivotably connected at a second hinge member to said trailer frame, said mechanism movable about said first and second hinge members from a first transit mode to a second deployed mode; and
an impact head assembly affixed to said first stage energy absorbing section.

2. The portable crash attenuation system of claim 1 further comprising:
first and second spaced apart energy absorbing tubes, said tubes held in generally parallel alignment by a spanning cross beam member; and a cross beam breaker attached to said impact head, said beam breaker aligned to impact and break said spanning cross beam member when said attenuation system is impacted in said second deployed mode.

3. The portable crash attenuation system of claim 1 wherein said energy absorbing mechanism further comprises:

at least one first mandrel having a first tensile strength;

at least one tubular member having a second tensile strength, said first mandrel receivable within a first end of said tubular member such that upon impact forces being applied to said impact head, said first mandrel is urged through said tubular member rupturing said tubular member thereby absorbing said impact forces.

4. A portable crash attenuation system comprising:

an impact head;

an energy absorption mechanism having a first stage energy absorbing section pivotably connected at a first hinge member to a second stage energy absorbing section, said second stage section pivotably connected at a second hinge member to a trailer frame, said mechanism movable about said first and second hinge members from a first transit position to a second deployed position said mechanism attached to said impact head, said energy absorbing mechanism further comprising:

at least one first mandrel having a first tensile strength;

at least one tubular member having a second tensile strength, said first mandrel receivable within a first end of said tubular member such that upon impact forces being applied to said impact head, said first mandrel is urged through said tubular member rupturing said tubular member thereby absorbing said impact forces, said first mandrel is generally rectangular and said tubular member is generally rectangular and said rupturing of said tubular member is confined to corners of said rectangular tubular member.

* * * * *

UNITED STATES PATENT AND TRADEMARK OFFICE
CERTIFICATE OF CORRECTION

PATENT NO. : 6,668,989 B2
DATED : December 30, 2003
INVENTOR(S) : John D. Reid, John R. Rohde and Dean L. Sicking It is certified that error appears in the above-identified patent and that said Letters Patent is hereby corrected as shown below:

Column 1,
Line 9, after "issued Oct. 30, 2001," insert the following:
-- This invention was made in part during work supported by a grant/contract, Contract No. DTRS57-98-C-00079 from DOT/RSPA/Volpe National Transportation System Center. The government may have certain rights in this invention. --.

Signed and Sealed this

Thirty-first Day of January, 2006

JON W. DUDAS
*Director of the United States Patent and Trademark Office*